(12) United States Patent
Toyohira

(10) Patent No.: US 11,351,833 B2
(45) Date of Patent: Jun. 7, 2022

(54) ELECTRIC SUSPENSION DEVICE

(71) Applicant: HONDA MOTOR CO., LTD., Tokyo (JP)

(72) Inventor: Tomoya Toyohira, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/983,153

(22) Filed: Aug. 3, 2020

(65) Prior Publication Data

US 2021/0031585 A1  Feb. 4, 2021

(30) Foreign Application Priority Data

Aug. 1, 2019 (JP) .............................. JP2019-142463

(51) Int. Cl.
*B60G 17/019*   (2006.01)
*B60G 17/0165*   (2006.01)

(52) U.S. Cl.
CPC ... *B60G 17/01941* (2013.01); *B60G 17/0165* (2013.01); *B60G 17/01908* (2013.01)

(58) Field of Classification Search
CPC .......... B60G 17/01941; B60G 17/0165; B60G 17/01908; B60G 2400/25
See application file for complete search history.

(56) References Cited

U.S. PATENT DOCUMENTS 4,714,272 A * 12/1987 Buma ................ B60G 17/0165
                                                                  280/5.516
4,726,604 A *  2/1988 Asami ................ B60G 21/0556
                                                                  280/5.514

(Continued)

FOREIGN PATENT DOCUMENTS

DE      10354944 A1 *  6/2005  ............ B60G 17/00
JP      H07-186670 A     7/1995

(Continued)

OTHER PUBLICATIONS

Office Action received in corresponding Japanese application No. 2019-142463 dated Apr. 5, 2022 with English translation (7 pages).

*Primary Examiner* — Paul N Dickson
*Assistant Examiner* — Kurtis Nielson
(74) *Attorney, Agent, or Firm* — Rankin, Hill & Clark LLP

(57) ABSTRACT

An electric suspension device, includes: an electromagnetic actuator which is arranged in parallel to a spring member provided between an unsprung member and a sprung member and produces a drive force; an information acquisition section which acquires acceleration information of the unsprung member and sprung member along the expansion-contraction axis; a damping force calculation section which calculates a target damping force; and a drive controller which performs drive control for the electromagnetic actuator using a target drive force based on the target damping force. The information acquisition section acquires a road profile signal based on the acceleration information concerning the front-wheel side. The damping force calculation section calculates the target damping force of the electromagnetic actuator provided at least on the rear-wheel side, based on a signal component within a rear-wheel-side vibration damping target frequency range, of the road profile signal based on the acceleration information concerning the front-wheel side.

2 Claims, 10 Drawing Sheets

(56) References Cited

U.S. PATENT DOCUMENTS

| | | | | |
|---|---|---|---|---|
| 4,813,705 A * | 3/1989 | Hagen | ................ | B60G 17/0165 280/5.517 |
| RE33,601 E * | 6/1991 | Asami | ................ | B60G 17/0165 180/41 |
| RE33,626 E * | 7/1991 | Asami | ................ | B60G 21/0556 280/5.517 |
| 5,142,475 A * | 8/1992 | Matsunaga | ...... | B60G 17/01941 280/5.504 |
| 5,173,858 A * | 12/1992 | Wada | ................ | B60G 17/0165 701/37 |
| 5,175,687 A * | 12/1992 | Tsutsumi | ......... | B60G 17/01941 280/5.515 |
| 5,243,525 A * | 9/1993 | Tsutsumi | ......... | B60G 17/01941 280/5.508 |
| 5,375,872 A * | 12/1994 | Ohtagaki | ............. | B60G 17/018 280/5.515 |
| 5,444,621 A * | 8/1995 | Matsunaga | ........ | B60G 17/0165 280/5.518 |
| 5,450,322 A * | 9/1995 | Tanaka | .................... | G01S 15/88 701/37 |
| 2014/0001717 A1 * | 1/2014 | Giovanardi | ........ | B60G 17/0165 280/5.518 |
| 2014/0005888 A1 * | 1/2014 | Bose | .................. | B60G 17/0165 701/37 |
| 2016/0046166 A1 * | 2/2016 | Norton | .................... | B60G 17/08 701/37 |
| 2017/0174034 A1 * | 6/2017 | Liu | .................... | B60G 17/0165 |
| 2017/0267051 A1 * | 9/2017 | Toyohira | ............... | B60G 17/018 |
| 2017/0274724 A1 * | 9/2017 | Liu | .................... | B60G 17/0165 |
| 2017/0349022 A1 * | 12/2017 | Masamura | ............. | B60G 17/08 |
| 2020/0406699 A1 * | 12/2020 | Yamahata | ............... | B60G 17/08 |

FOREIGN PATENT DOCUMENTS

| | | | | |
|---|---|---|---|---|
| JP | H08-332824 A | | 12/1996 | |
| JP | 3158734 B2 * | | 4/2001 | ......... B60G 17/0195 |
| JP | 6417443 B1 * | | 11/2018 | ............. B60G 17/02 |
| JP | 6417443 B1 | | 11/2018 | |
| WO | WO-2018193685 A1 * | | 10/2018 | ......... B60G 17/0165 |

* cited by examiner

ELECTRIC SUSPENSION DEVICE

CROSS-REFERENCE TO RELATED APPLICATION

This application is based upon and claims priority from the Japanese Patent Application No. 2019-142463, filed on Aug. 1, 2019, the entire contents of which are incorporated herein by reference.

BACKGROUND OF THE INVENTION

1. Field of the Invention

The present invention relates to an electric suspension device including an electromagnetic actuator which is arranged in parallel a spring member provided between the body and each wheel of a vehicle and which produces a drive force concerning damping operation and expansion-contraction operation.

2. Description of the Related Art

The applicant of the present invention has proposed an electric suspension device including an electromagnetic actuator which is arranged in parallel to a spring member provided between the body and each wheel of a vehicle and which produces a drive force concerning damping operation and expansion-contraction operation (see Japanese Patent Publication No. 6417443 (Patent Literature 1), for example). The electromagnetic actuator includes a ball screw mechanism in addition to an electric motor. The electromagnetic actuator converts rotary motion of the electric motor to linear motion of the ball screw mechanism to produce a drive force concerning damping operation and expansion-contraction operation.

Herein, the drive force concerning damping operation means a damping force, which is a force (reaction force) in a direction opposite to the direction of a stroke of the electromagnetic actuator. The drive force concerning expansion-contraction operation means an expansion-contraction force, which is a force in a direction along the direction of expansion or contraction of the electromagnetic actuator. The drive force concerning expansion-contraction operation is a force produced in the same or opposite direction to the stroke direction, independently of the stroke direction.

In order to provide a vehicle with more comfortable ride and more stable steering, it was highly desirable that the electric suspension device according to Patent Literature 1 was prevented from falling into full bump or full rebound.

In order to respond to the request, the electric suspension device according to Patent Literature 1 includes: an electromagnetic actuator which is arranged beside a spring member provided between the body and each wheel of the vehicle and produces a drive force concerning damping operation and expansion-contraction operation; an information acquisition section which acquires the stroke position of the electromagnetic actuator; and an ECU which sets a target damping force and a target expansion-contraction force of the electromagnetic actuator and performs drive control for the electromagnetic actuator using a target drive force based on the target damping force and target expansion-contraction force.

When the stroke position is at an end region around either end of a stroke, the ECU corrects the target drive force so as to move the stroke position from the end region toward a neutral region.

With the electric suspension device according to Patent Literature 1, it is possible to prevent the vehicle traveling under sever conditions from falling into full bump or full rebound.

SUMMARY OF THE INVENTION

However, in a situation where a vehicle is traveling along a road including connections (steps) at certain intervals, for example, no special consideration is given to the electric suspension device according to Patent Literature 1 in regard to properly reducing vibrations occurring when the rear wheels travel over the steps.

SUMMARY OF THE INVENTION

The present invention has been made in the light of the aforementioned circumstances and makes it an object thereof to provide an electric suspension device which, in a situation where a vehicle is traveling along a road with steps at certain intervals, properly reduces vibrations occurring when the rear wheels travel over the steps.

To implement the aforementioned object, an electric suspension device according to a first aspect of the present invention include: an electromagnetic actuator which is arranged in parallel to a spring member provided between an unsprung member including wheels of a vehicle and a sprung member including a vehicle body and produces a drive force for damping operation and expansion-contraction operation; an information acquisition section which acquires acceleration information of at least one of the unsprung member and sprung member along the expansion-contraction axis; a damping force calculation section which calculates a target damping force as a target value for the damping operation of the electromagnetic actuator; and a drive controller which performs drive control for the electromagnetic actuator using a target drive force based on the target damping force calculated by the damping force calculation section. The electromagnetic actuator is provided at least on a rear-wheel side, the information acquisition section acquires a road profile signal based on the acceleration information concerning at least the front-wheel side, the damping force calculation section calculates the target damping force of the electromagnetic actuator provided on the rear-wheel side, based on a signal component within a rear-wheel-side vibration damping target frequency range, of the road profile signal based on the acceleration information concerning the front-wheel side acquired by the information acquisition section, and the drive controller performs drive control for the electromagnetic actuator provided on the rear-wheel side, using the target drive force based on the target damping force calculated by the damping force calculation section.

According to the present invention, even in a situation where the vehicle is traveling along a road with steps at certain intervals, for example, it is possible to properly reduce vibrations occurring when the rear wheels travel over the steps.

DETAILED DESCRIPTION OF THE EMBODIMENTS

Figure 1:
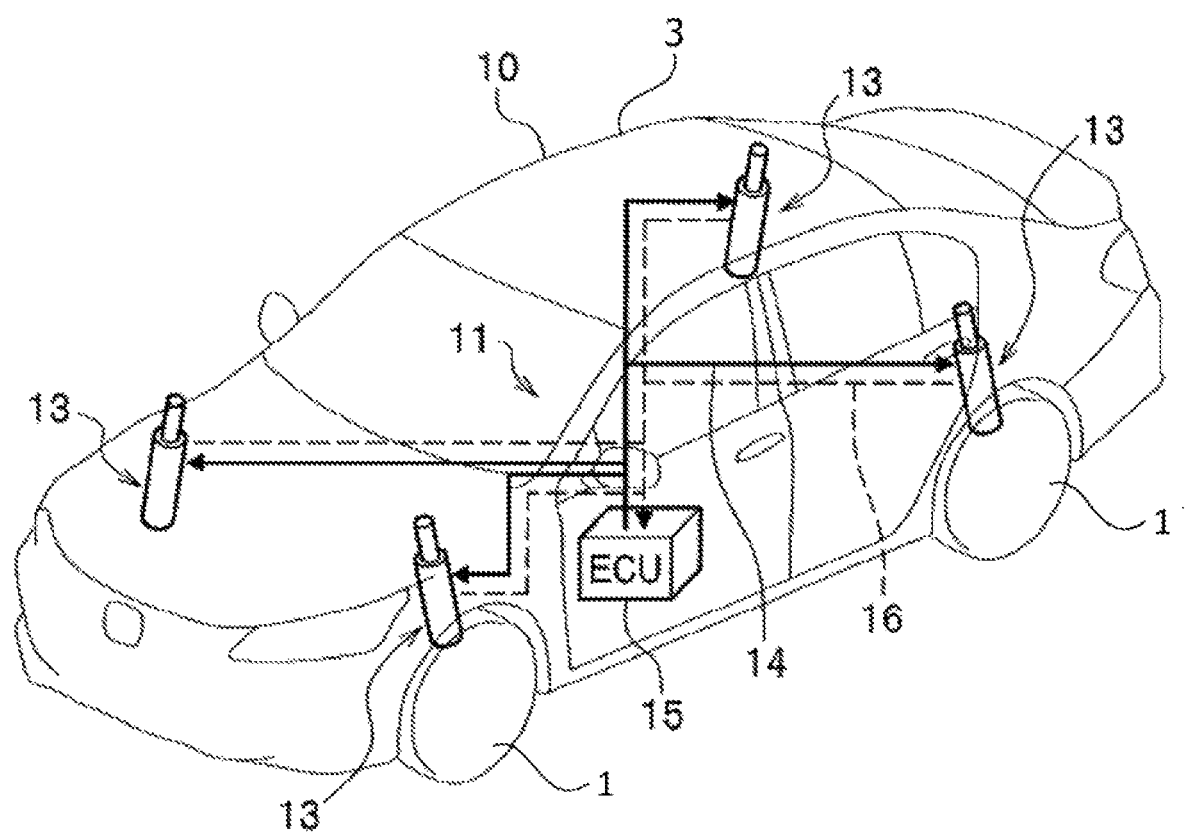
FIG. 1 is an entire configuration diagram of an electric suspension device according to an embodiment of the present invention.

Electric suspension device according to embodiments of the present invention will be hereinafter described in detail with reference to the accompanying drawings.

In the drawings illustrated below, members including the same functions are given the same reference numerals. Some members are schematically illustrated with the size and shape being modified or exaggerated for convenience of explanation.

In this specification, the term "right" refers to the right-hand side as viewed in the direction of the vehicle's forward movement while the term "left" refers to the left-hand side.

Brief Description of Electric Suspension Device 11 According to Present Invention First, brief description of an electric suspension device 11 according to the embodiment of the present invention will be given with reference to FIGS. 1, 2A, and 2B.

FIG. 1 is an entire configuration diagram of the electric suspension device 11 according to an embodiment of the present invention. FIG. 2A is a model diagram of a suspension system including an electromagnetic actuator 13 which is provided for the electric suspension device 11 according to the embodiment of the present invention. FIG. 2B is a partial cross-sectional view of the electromagnetic actuator 13 illustrated in FIG. 2A.

Figure 2A:
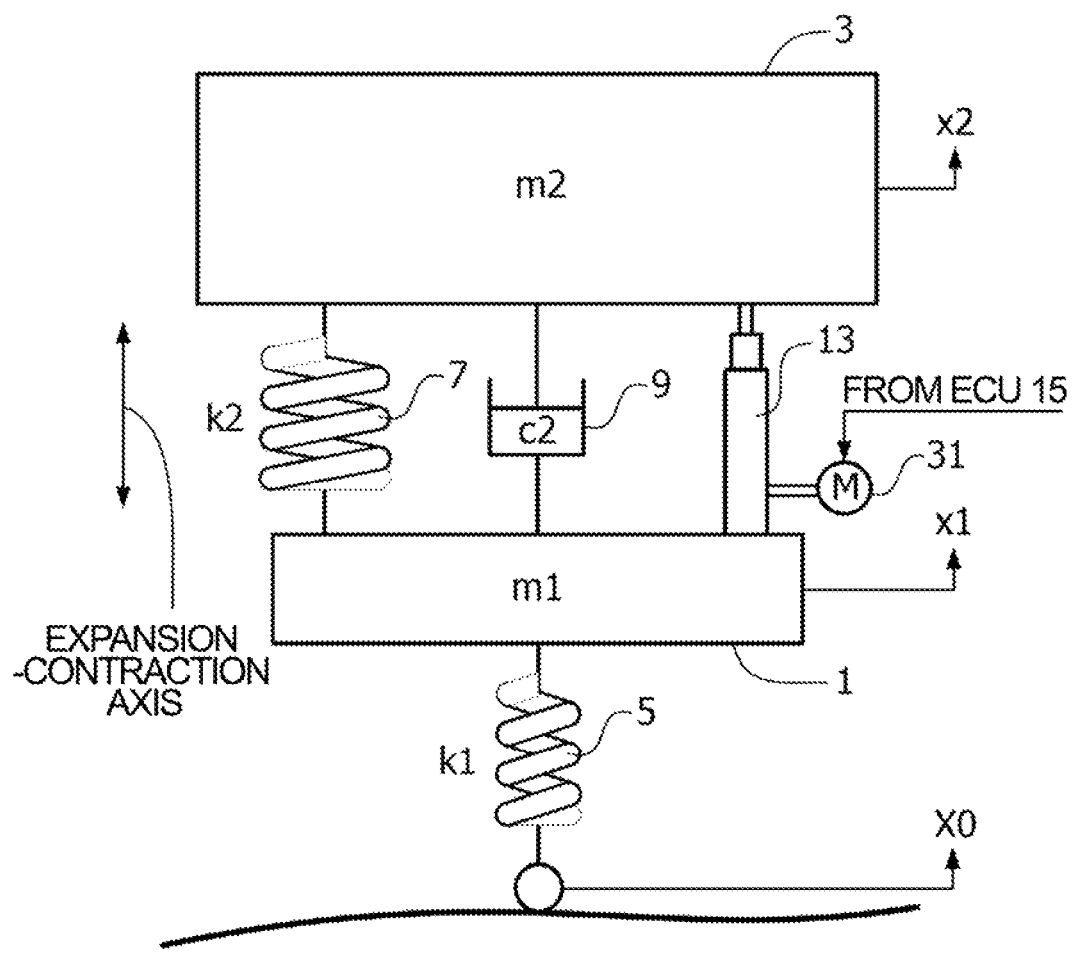
FIG. 2A is a model diagram of a suspension system including an electromagnetic actuator which is provided for the electric suspension device according to the embodiment of the present invention.

As illustrated in FIGS. 1 and 2A, a vehicle 10 includes: an unsprung member (unsprung weight m1, unsprung displacement x1) including front wheels (right and left front wheels) 1 and rear wheels (right and left rear wheels) 3; and a sprung member (sprung weight m2, sprung displacement x2) including a vehicle body. Each wheel is provided with a tire 5 represented as a coil spring (tire spring constant k1) in FIG. 2A. The tire 5 is in contact with a road surface (road displacement: x0). In the following description, the right front and right rear wheels are collectively referred to as right wheels when needed, and the left front and left rear wheels are collectively referred to as left wheels when needed.

The vehicle 10 may be any one of a front-wheel-drive vehicle, a rear-wheel-drive vehicle, and a four-wheel-drive vehicle.

In between the unsprung member 1 and sprung member 3, a spring member (spring constant k2) 7, a damper member (damping coefficient c2) 9, and the electromagnetic actuator 13 are provided for each wheel illustrated in FIG. 2A, so as to freely expand and contract along an expansion-contraction axis.

The electric suspension device 11 according to the present invention, as illustrated in FIG. 1, includes: the plurality of electromagnetic actuators 13, which are provided for the respective wheels of a vehicle 10; and an electronic control unit (hereinafter, referred to as an ECU) 15. The plural electromagnetic actuators 13 connect to the ECU 15 through power lines 14 (see solid lines in FIG. 1) and signal lines 16 (see dashed lines in FIG. 1). The power lines 14 supply electric power for drive control, from the ECU 15 to the plural electromagnetic actuators 13. The signal lines 16 transmit stroke positions of the plural electromagnetic actuators 13, from the electromagnetic actuators 13 to the ECU 15.

In this embodiment, each of the plural electromagnetic actuators 13 includes the same configuration. The following description will be given to one of the plural electromagnetic actuators 13, instead of the plural electromagnetic actuators 13.

Figure 2B:
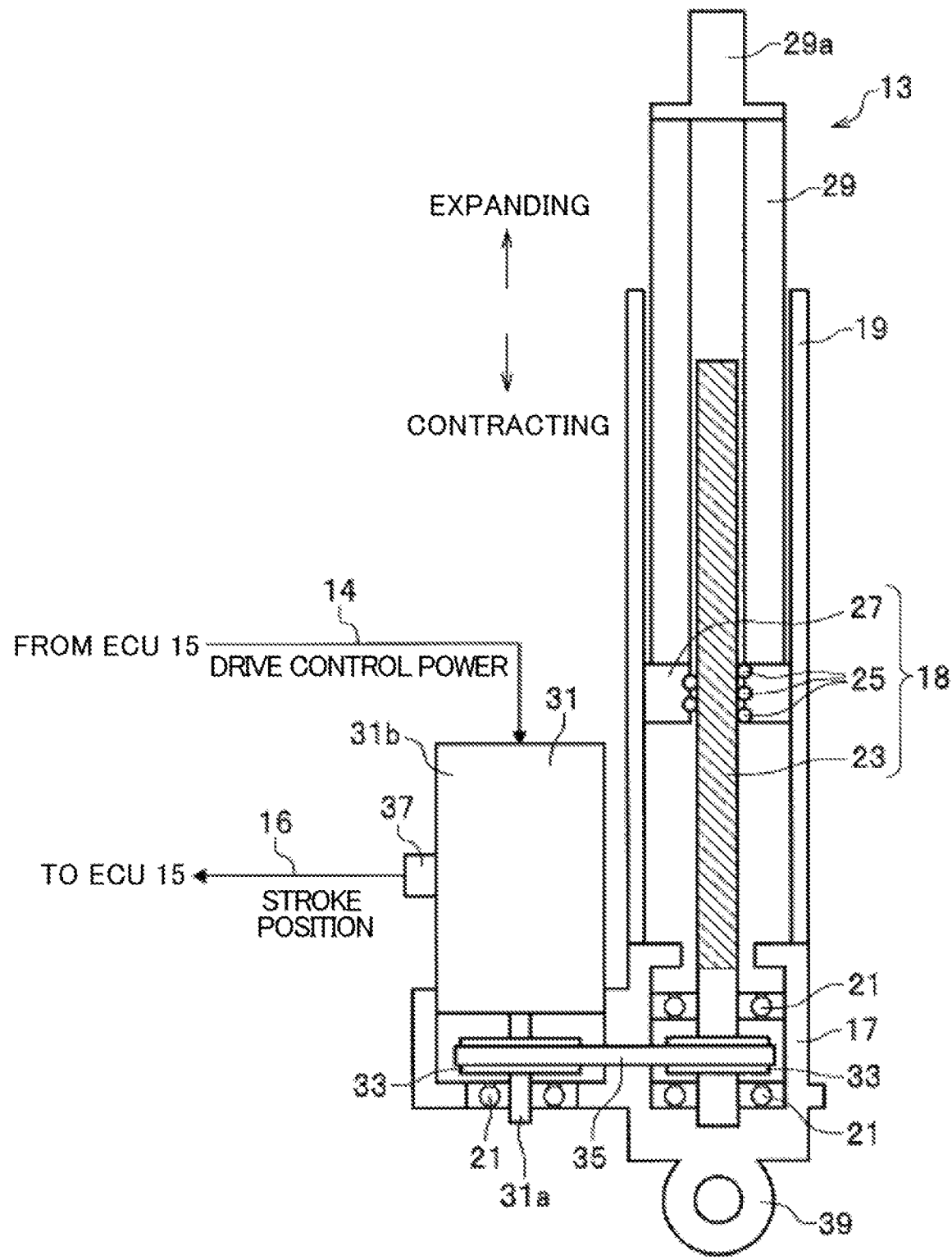
FIG. 2B is a partial cross-sectional view of the electromagnetic actuator illustrated in FIG. 2A.

As illustrated in FIG. 2B, the electromagnetic actuator 13 includes a base housing 17, an outer tube 19, ball bearings 21, a ball screw shaft 23, plural balls 25, a nut 27, and an inner tube 29.

The base housing 17 supports the proximal end of the ball screw shaft 23 with the ball bearings 21 interposed therebetween so that the ball screw shaft 23 freely rotate around the axis thereof. The outer tube 19 is provided for the base housing 17 and accommodates a ball screw mechanism 18, which includes the ball screw shaft 23, plural balls 25, and nut 27. The plural balls 25 roll along the thread groove of the ball screw shaft 23. The nut 27 engages with the ball screw shaft 23 with the plural balls 25 interposed therebetween and converts rotary motion of the ball screw shaft 23 into linear motion. The inner tube 29 connected to the nut 27 is displaced along the axis of the outer tube 19 integrally with the nut 27.

To transmit a rotary drive force to the ball screw shaft 23, the electromagnetic actuator 13 includes an electric motor 31 (see FIGS. 2A and 2B), a pair of pulleys 33, and a belt member 35 as illustrated in FIG. 2B. The electric motor 31 is provided for the base housing 17 in parallel with the outer tube 19.

The pulleys 33 are attached to a motor shaft 31a of the electric motor 31 and the ball screw shaft 23. On the pair of pulleys 33, the belt member 35 is laid to transmit the rotary drive force of the electric motor 31 to the ball screw shaft 23.

A casing 31b of the electric motor 31 is provided with a resolver 37, which detects a rotation angle signal from the electric motor 31. The rotation angle signal of the electric motor 31 detected by the resolver 37 is transmitted to the ECU 15 through one of the signal lines 16. In the embodiments of the present invention, the rotation angle of the electric motor can be replaced with the stroke position of the electromagnetic actuator 13. This is because the stroke position of the electromagnetic actuator 13 is displaced in either a direction of expansion or contraction (see FIG. 2) with a change in the rotation angle of the electric motor 31.

The rotary drive of the electric motor 31 is controlled based on the drive control power which is supplied to each electromagnetic actuator 13 through one of the power lines 14 by the ECU 15.

The embodiment of the present invention employ the layout in which the motor shaft 31a of the electric motor 31 and the ball screw shaft 23 are arranged substantially in parallel and are connected to each other as illustrated in FIG. 2B. The dimension of the electromagnetic actuator 13 along the axis is thereby reduced. However, the motor shaft 31a of the electric motor 31 and the ball screw shaft 23 may be coaxially arranged and connected to each other.

In the electromagnetic actuator 13 according to the embodiment of the present invention, as illustrated in FIG. 2B, a connection member 39 is provided at the lower end of the base housing 17. The connection member 39 is coupled and fixed to a lower arm (not illustrated) constituting a part of the unsprung member 1. An upper end 29a of the inner tube 29 is coupled and fixed to a strut tower (not illustrated) on the vehicle body's side which constitutes a part of the sprung member 3.

In other words, the electromagnetic actuator 13 is arranged in parallel to the spring member 7, which is provided between the unsprung member 1 and sprung member 3 of the vehicle 10.

The sprung member 3 is provided with a sprung acceleration sensor 43, which detects acceleration of the vehicle body (sprung) along the stroke axis of the electromagnetic actuator 13. The unsprung member 1 is provided with an unsprung acceleration sensor 45, which detects acceleration of the wheel (unsprung) along the stroke axis of the electromagnetic actuator 13.

The electromagnetic actuator 13 configured as described above operates as follows. For example, it is assumed that the connection member 39 is subjected to an upward external force concerning vertical vibration from the wheel's side of the vehicle 10. In this case, with respect to the outer tube 19 subjected to the external force concerning vertical vibration, the inner tube 29 and nut 27 are intended to move down integrally. The ball screw shaft 23 is then intended to rotate in a direction corresponding to the downward motion of the nut 27. In this process, the electromagnetic actuator 13 produces a rotary drive force of the electric motor 31 in such a direction as to prevent the nut 27 from moving down. The thus-produced rotary drive force of the electric motor 31 is transmitted to the ball screw shaft 23 through the belt member 35.

In such a manner, the electromagnetic actuator 13 applies a damping force (a force in the direction opposite to the stroke direction), which is a reaction force against the upward external force concerning vertical vibration, to the ball screw shaft 23, thus damping vibration to be transmitted from the wheel side to the body side.

Internal Configuration of ECU 15

Figure 3:
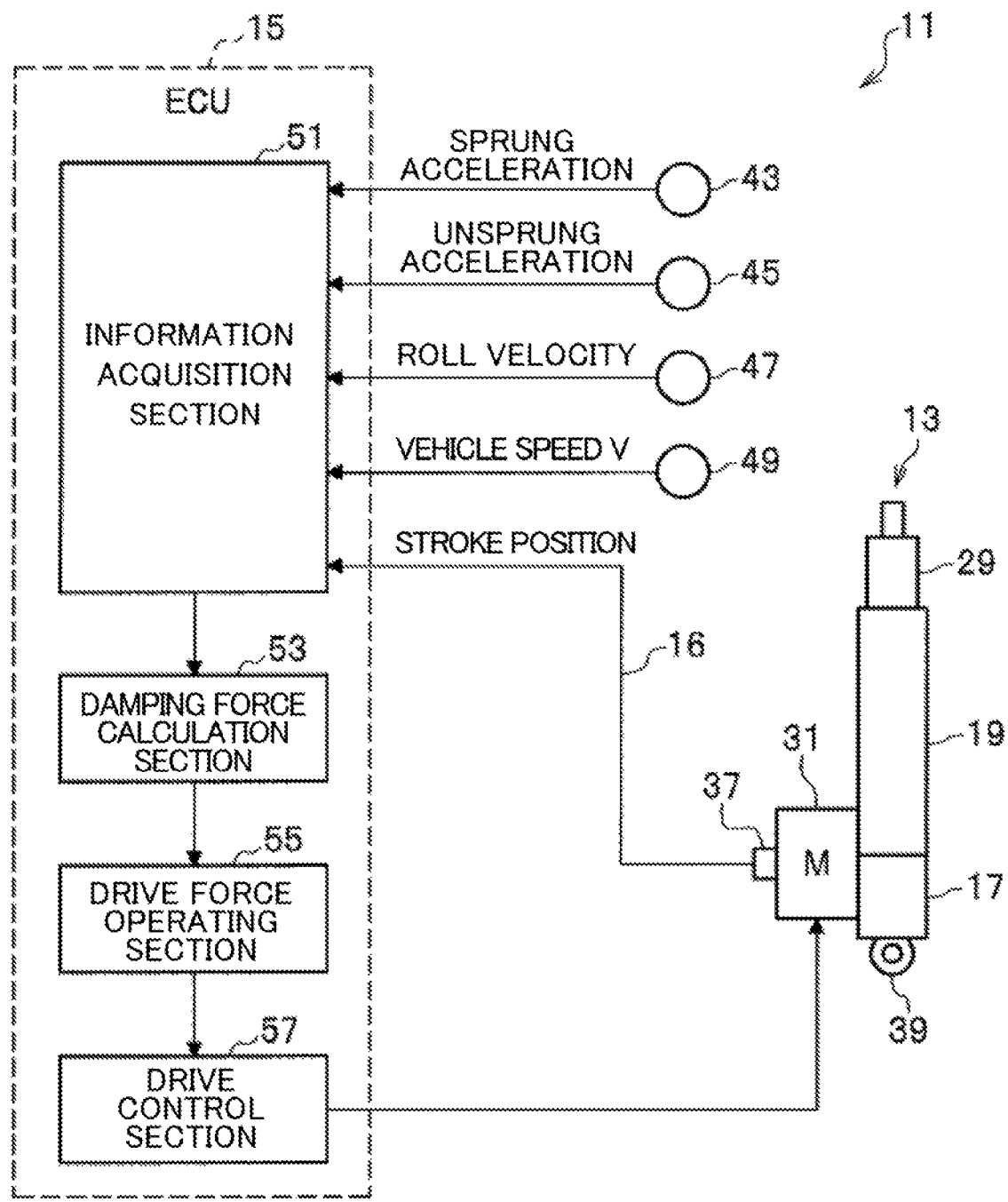
FIG. 3 is a configuration diagram conceptually illustrating the inside of a drive control apparatus included in the electric suspension device according to the embodiment of the present invention and the periphery thereof.

Next, the internal configuration of the ECU 15 as a drive control apparatus included in the electric suspension device 11 will be described with reference to FIG. 3. FIG. 3 is a configuration diagram conceptually illustrating the inside of the drive control apparatus (ECU 15) included in the electric suspension device 11 and the periphery thereof.

The ECU 15 includes a microcomputer performing various types of arithmetic processing. The ECU 15 includes a drive control function to produce a drive force concerning damping operation and expansion-contraction operation by individually performing drive control for each of the electromagnetic actuators 13 based on the rotation angle of the electric motor 31 detected by the resolver 37, that is, the stroke position of the electromagnetic actuator 13 or the like. The ECU 15 corresponds to a drive controller of the present invention.

To implement the aforementioned drive control function, the ECU 15 includes an information acquisition section 51, a damping force calculation section 53, a drive force operating section 55, and a drive control section 57 as illustrated in FIG. 3.

The information acquisition section 51 acquires the rotation angle of each electric motor 31 detected by any resolver 37, that is, the stroke position of each electromagnetic actuator 13. The information acquisition section 51 also acquires the sprung accelerations detected by the sprung acceleration sensors 43 concerning the front- and rear-wheel sides, the unsprung accelerations detected by the unsprung acceleration sensors 45 concerning the front- and rear-wheel sides, the roll velocity detected by a roll velocity sensor 47, information on vehicle speed V detected by a vehicle speed sensor 49, information on wheelbase length (WB information, see (a) to (C) of FIG. 6), and processing delay time information.

The information acquisition section 51 further calculates the stroke speed of each electromagnetic actuator 13 (hereinafter, sometimes just referred to as stroke speed) by differentiating the displacement of the stroke position of the electromagnetic actuator 13 with respect to time. The stroke speed of the electromagnetic actuator 13 includes both the stroke speed and stroke direction. The vehicle condition information including the stroke speed of each electromagnetic actuator 13, the sprung accelerations, the unsprung accelerations, the roll velocity, the vehicle speed V, the wheelbase length, and the processing delay time which are acquired by the information acquisition section 51 is transmitted to the damping force calculation section 53.

The damping force calculation section 53 calculates a target damping force as the target value for damping operation of each electromagnetic actuator 13, based on the vehicle condition information acquired by the information acquisition section 51. The information on the target damping force calculated by the damping force calculation section 53 is transmitted to the drive force operating section 55.

Figure 4A:
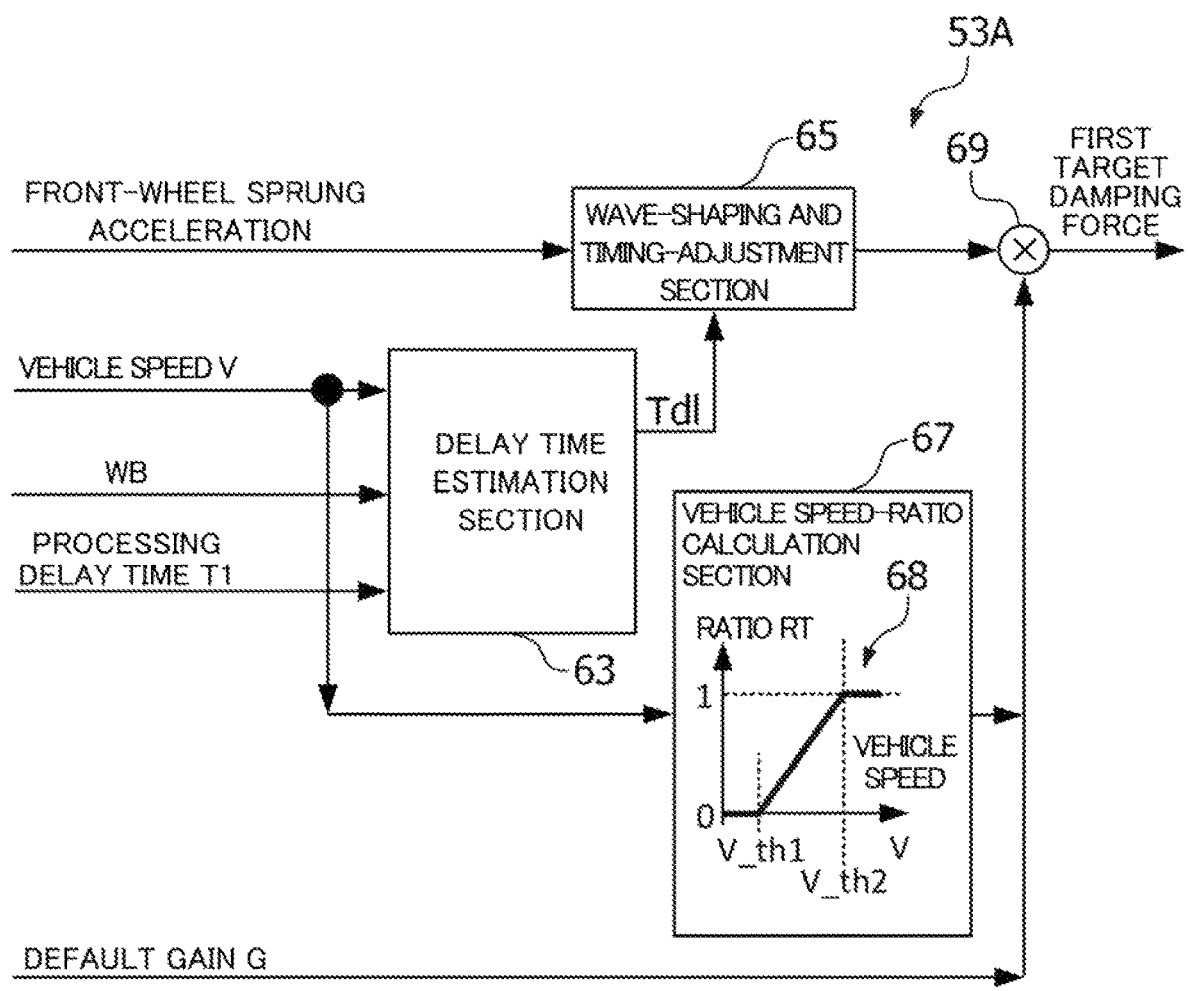
FIG. 4A is a block diagram of a first damping force calculation section included in the drive control apparatus illustrated in FIG. 3.
Figure 4B:
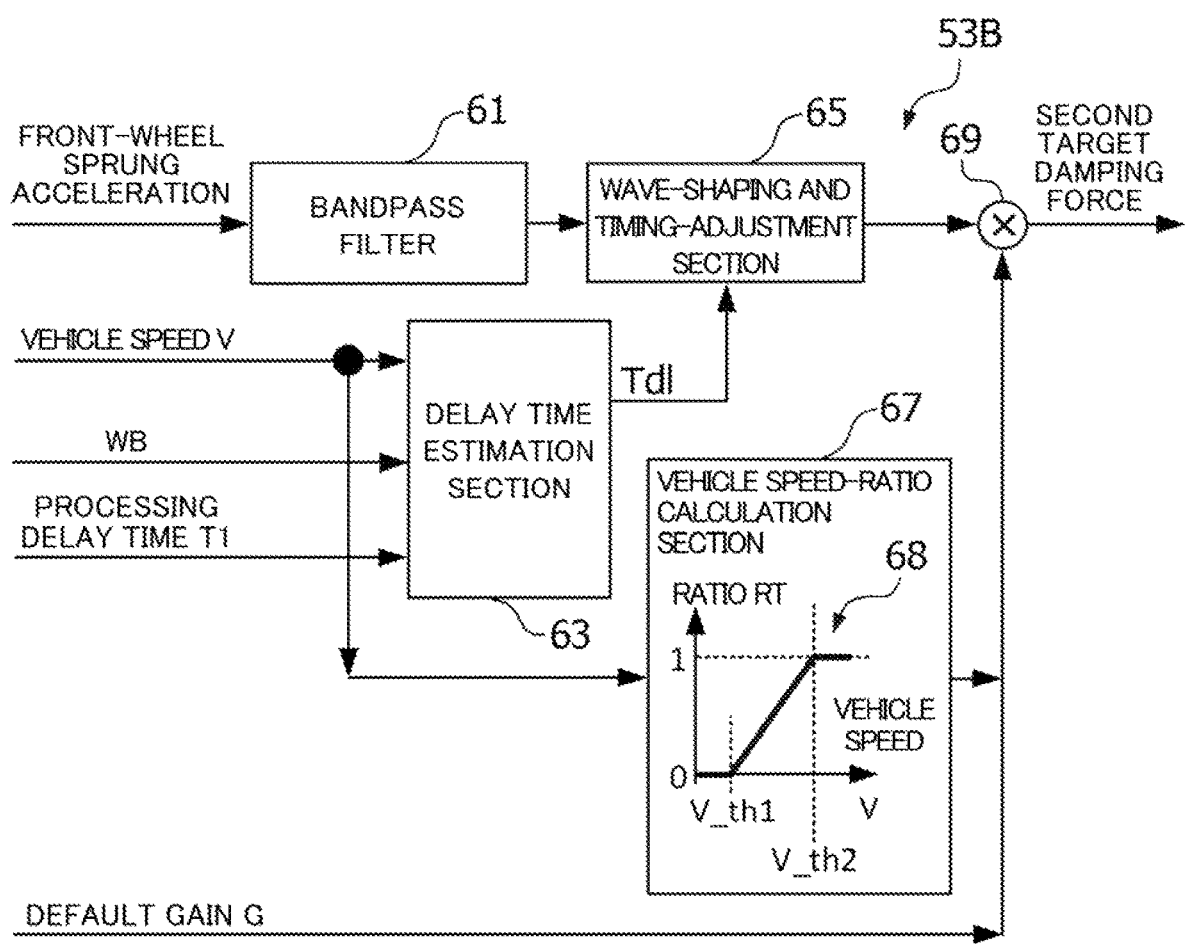
FIG. 4B is a block diagram of a second damping force calculation section included in the drive control apparatus illustrated in FIG. 3.
Figure 4C:
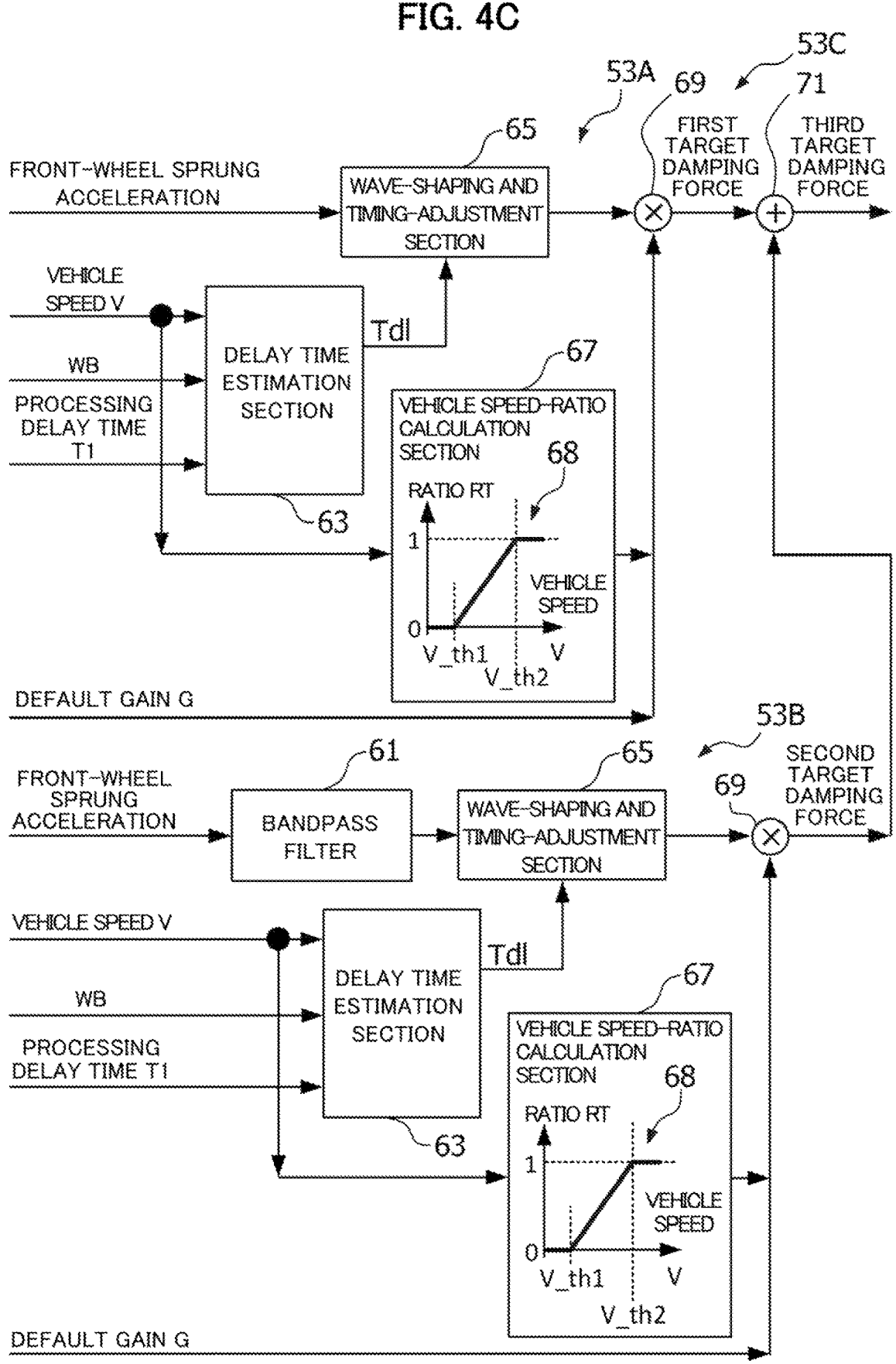
FIG. 4C is a block diagram of a third damping force calculation section included in the drive control apparatus illustrated in FIG. 3.

Examples of the damping force calculation section 53 according to the embodiment of the present invention include a first damping force calculation section 53A (see FIG. 4A), a second damping force calculation section 53B (see FIG. 4B), and a third damping force calculation section 53C (see FIG. 4C). The processes performed by the first to third damping force calculation sections 53A to 53C will be described later in detail.

The drive force operating section 55 receives the information on the stroke speed and creates a damping force control signal and an expansion-contraction force control signal with reference to the received information on the stroke speed and a damping force map (not illustrated) in which values of the stroke speed are associated with values of the damping force changing therewith. The drive force operating section 55 further merges the created damping force control signal and expansion-contraction force control signal to create a drive control signal including the target drive force. The drive control signal including the target drive force, as the result of calculation by the drive force operating section 55, is transmitted to the drive control section 57. The specific operation by the drive force operating section 55 will be described in detail later.

The drive control section 57 supplies drive control power to the electric motor 31 provided for each of the plural electromagnetic actuators 13 according to the drive control signal transmitted from the drive force operating section 55, thus independently performing drive control for the plural electromagnetic actuators 13. The process of generating the drive control power to be supplied to the electric motor 31 preferably uses an inverter control circuit, for example.

Block Configuration of First Damping Force Calculation Section 53A

Next, the block configuration of the first damping force calculation section 53A included in the drive control apparatus (ECU) 15 according to the embodiment of the present invention will be described with reference to FIG. 4A. FIG. 4A is a block diagram of the first damping force calculation section 53A included in the drive control apparatus 15.

The first damping force calculation section 53A included in the drive control apparatus 15 according to the embodiment of the present invention includes a delay time estimation section 63, a wave-shaping and timing-adjustment section 65, a vehicle speed ratio calculation section 67, and a multiplier 69 as illustrated in FIG. 4A.

The delay time estimation section 63 includes a function of estimating a delay time Td1, which is the time between when the front-wheel side of the vehicle 10 moving forward receives a road input and when the rear-wheel side receives the same road input subsequently. To be specific, the delay time estimation section 63 estimates the delay time Td1 by using the following expression 1 based on the vehicle speed V (m/sec), wheelbase (WB) length (m), and processing delay time information T1 (sec).

$$Td1 = (WB \text{ length/vehicle speed } V) - T1 \quad (1)$$

Herein, the delay time Td1, which is the time between when the front-wheel side of the vehicle 10 moving forward receives a road input and when the rear-wheel side receives the same road input subsequently, can be technically expressed as (WB length/vehicle speed V). In practice, the process of recognizing and transmitting the reception of a road input includes a delay (the processing delay time information T1) between when the front-wheel side actually receives the road input and when the front-wheel side detects reception of the road input. The delay time Td1 is therefore estimated by subtracting the processing delay time information T1 from (WB length/vehicle speed V).

The wave-shaping and timing-adjustment section 65 includes a function of wave shaping to create a signal waveform for implementing vibration damping on the rear-wheel side, from a signal component within a rear-wheel-side vibration damping target frequency range, in a road profile signal based on the acceleration information of the sprung member 3 on the front-wheel side along the expansion-contraction axis. The wave-shaping and timing-adjustment section 65 further includes a function of adjusting the timing of occurrence of the created signal waveform, based on the delay time Td1 estimated by the delay time estimation section 63.

The vehicle speed ratio calculation section 67 includes a function of calculating the value of a ratio RT depending on the vehicle speed V. The ratio RT is used in gain adjustment for a vibration damping signal on the rear-wheel side obtained by the wave shaping and the adjustment of the timing in the wave-shaping and timing-adjustment section 65.

A vehicle speed ratio table 68 according to the embodiment is configured to include the following characteristics: the ratio RT is assigned to a constant (RT=0) for a low-speed region where the vehicle speed V is lower than a first vehicle speed threshold V_th1; the ratio RT is assigned to a constant (RT=1) for a high-speed region where the vehicle speed V is higher than a second vehicle speed threshold V_th2; and the ratio RT is assigned to a linear variable (0<RT<1) for an intermediate-speed region where the vehicle speed V is not lower than the first vehicle speed threshold V_th1 and not higher than the second vehicle speed threshold V_th2.

Since the ratio RT is assigned to a constant (RT=0) for the low-speed region where the vehicle speed V is lower than the first vehicle speed threshold V_th1, the target damping force for the vibration damping on the rear-wheel side based on the road profile signal on the front-wheel side is 0 (the target damping force is not corrected based on the vehicle speed V) for the low-speed region.

Since the ratio RT is assigned to a constant (RT=1) for the high-speed region where the vehicle speed V is higher than the second vehicle speed threshold V_th2, the gain of the target damping force for the vibration damping on the rear-wheel side based on the road profile signal on the front-wheel side is 1 (the target damping force is not corrected based on the vehicle speed V) for the high-speed region.

Since the ratio RT is assigned to a linear variable (0<RT<1) for the intermediate-speed region where the vehicle speed V is not lower than the first vehicle speed threshold V_th1 and not higher than the second vehicle speed threshold V_th2, the gain of the target damping force for the vibration damping on the rear-wheel side based on the road profile signal on the front-wheel side is a value between 0 and 1 for the intermediate-speed region. In other words, for the intermediate-speed region, the amount of downward correction of the target damping force is linearly reduced as the vehicle speed V increases and is linearly increased as the vehicle speed V decreases.

The multiplier 69 receives the vibration damping signal on the rear-wheel side obtained by the wave shaping and the adjustment of the timing by the wave-shaping and timing-adjustment section 65, the value of the ratio RT calculated by the vehicle speed ratio calculation section 67 (based on the vehicle speed V), and the value of the default gain G. The multiplier 69 multiplies the vibration damping signal on the rear-wheel side obtained by the wave shaping and the adjustment of the timing by the wave-shaping and timing-adjustment section 65, the value of the ratio RT and the value of the default gain G to calculate a first target damping force for the vibration damping effect on the rear-wheel side based on the road profile signal on the front-wheel side. The first target damping force calculated by the multiplier 69 is transmitted to the drive force operating section 55 illustrated in FIG. 3.

Block Configuration of Second Damping Force Calculation Section 53B

Next, the block configuration of the second damping force calculation section 53B included in the drive control apparatus (ECU) 15 according to the embodiment of the present invention will be described with reference to FIG. 4B. FIG. 4B is a block diagram of the second damping force calculation section 53B included in the drive control apparatus 15.

As illustrated in FIG. 4B, many components in the block configuration of the second damping force calculation section 53B are the same as those of the first damping force calculation section 53A (see FIG. 4A). The block configuration of the second damping force calculation section 53B will be described by focusing on different components from the first damping force calculation section 53A (a bandpass filter 61) and components directly related thereto (the wave-shaping and timing-adjustment section 65 and multiplier 69).

The bandpass filter 61 receives a road profile signal based on the front-wheel unsprung acceleration occurring at the unsprung member 1 on the front-wheel side as the vehicle 10 moves forward. The bandpass filter 61 performs predetermined bandpass filtering for the received road profile signal and outputs the bandpass-filtered road profile signal in which a predetermined frequency range is intensified.

The predetermined bandpass filtering by the bandpass filter 61 passes a signal component within a predetermined frequency range of the frequency range concerning the road profile signal while removing a signal component out of the predetermined frequency range. The bandpass filter 61 therefore outputs the road profile signal with the predetermined frequency range intensified. The bandpass filter 61 corresponds to an extraction section of the present invention.

The signal component within the predetermined frequency range is a signal component within the rear-wheel-side vibration damping target frequency range (which is a range of frequencies that produce a feeling of discomfort in occupants, 4 to 20 Hz, for example). The objective of the present invention is to reduce signal components that produce a feeling of discomfort in occupants in the sprung member 3 on the rear-wheel side, based on the road profile signal produced at the unsprung member 1 on the front-wheel side.

The road profile signal based on the acceleration information of the unsprung member 1 on the front-wheel side along the expansion-contraction axis, after being subjected to the bandpass filtering in the bandpass filter (extraction section) 61 is transmitted to the wave-shaping and timing-adjustment section 65.

The wave-shaping and timing-adjustment section 65 performs wave shaping to create a signal waveform for implementing vibration damping on the rear-wheel side, from the signal component within the rear-wheel-side vibration damping target frequency range, of the road profile signal based on the acceleration information of the unsprung member 1 on the front-wheel side along the expansion-contraction axis after being subjected to the bandpass filtering in the bandpass filter (extraction section) 61. The wave-shaping and timing-adjustment section 65 further adjusts the timing of occurrence of the created signal waveform, based on the delay time Td1 estimated by the delay time estimation section 63.

The vibration damping signal on the rear-wheel side obtained by the wave shaping and the adjustment of the timing in the wave-shaping and timing-adjustment section 65 is transmitted to the multiplier 69.

The multiplier 69 receives the vibration damping signal on the rear-wheel side obtained by the wave shaping and the adjustment of the timing in the wave-shaping and timing-adjustment section 65, the value of the ratio RT calculated by the vehicle speed ratio calculation section 67 (based on the vehicle speed V), and the value of the default gain G. The multiplier 69 multiplies the vibration damping signal on the rear-wheel side obtained by the wave shaping and the adjustment of the timing by the value of the ratio RT and the value of the default gain G to calculate a second target damping force for the vibration damping effect on the rear-wheel side based on the road profile signal on the front-wheel side. The second target damping force calculated by the multiplier 69 is transmitted to the drive force operating section 55 illustrated in FIG. 3.

Block Configuration of Third Damping Force Calculation Section 53C

Next, the block configuration of the third damping force calculation section 53C included in the drive control apparatus (ECU) 15 according to the embodiment of the present invention will be described with reference to FIG. 4C. FIG. 4C is a block diagram of the third damping force calculation section 53C included in the drive control apparatus 15.

As illustrated in FIG. 4C, many components in the block configuration of the third damping force calculation section 53C are the same as those in the block configuration of the first damping force calculation section 53A (see FIG. 4A) or the second damping force calculation section 53B (see FIG. 4B). The block configuration of the third damping force calculation section 53C will be therefore described by focusing on the component (an adder 71) other than the above same components.

The adder 71 receives the value of the first target damping force calculated by the first damping force calculation section 53A and the value of the second target damping force calculated by the second damping force calculation section 53B and adds these values to calculate a third target damping force for the vibration damping effect on the rear-wheel side based on the road profile signal on the front-wheel side. The third target damping force calculated by the adder 71 is transmitted to the drive force operating section 55 illustrated in FIG. 3.

Explanation of Operation of Electric Suspension Device 11 According to Embodiment of Present Invention Next, the operation of the electric suspension device 11 according to the embodiment of the present invention will be described with reference to FIG. 5.

Figure 5:
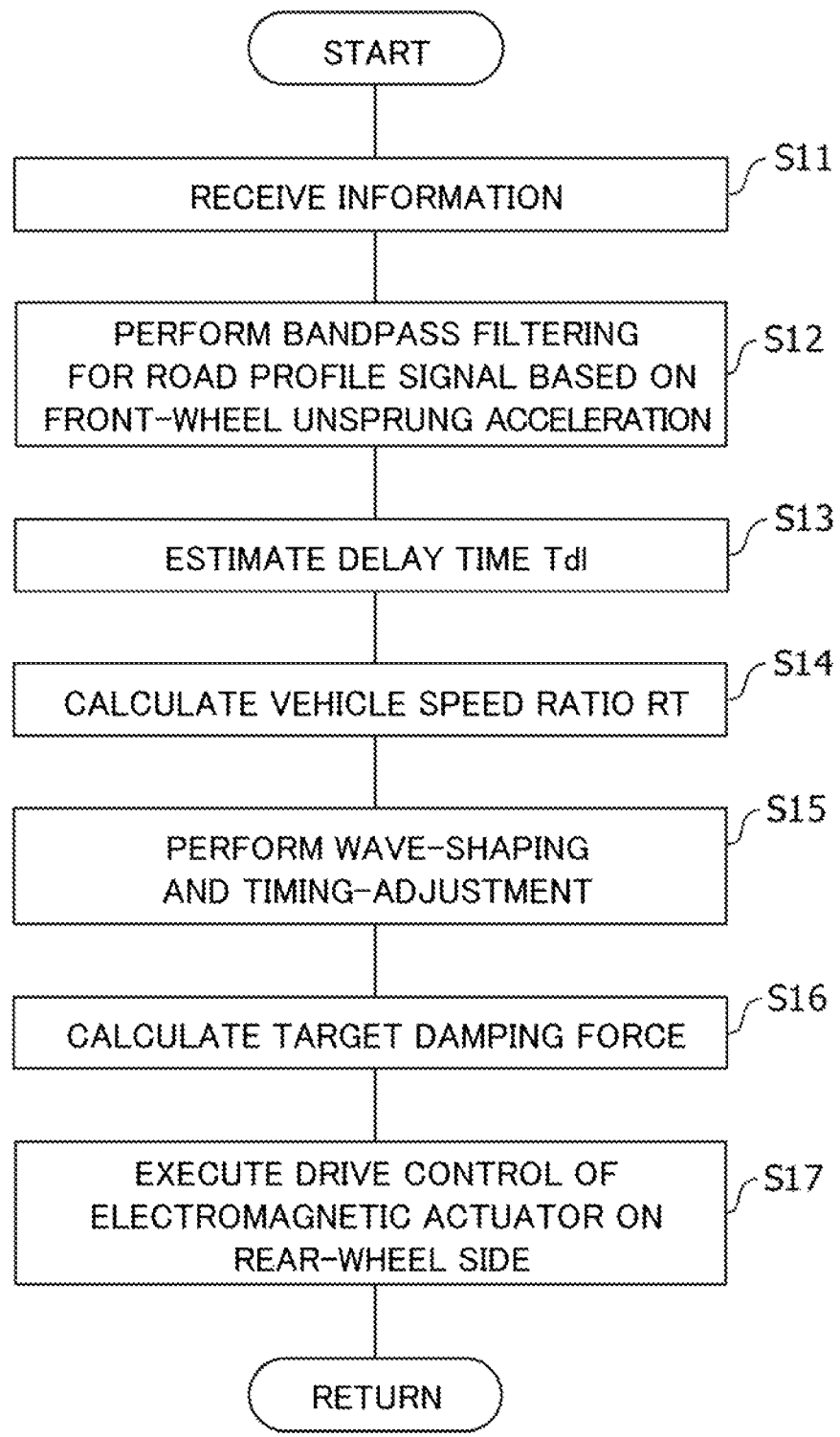
FIG. 5 is a diagram for explaining operations of the electric suspension device according to the embodiment of the present invention.

FIG. 5 is a flowchart for explaining the operation of the electric suspension device 11 according to the embodiment of the present invention. The operation of the electric suspension device 11 according to the embodiment of the present invention will be described using the third damping force calculation section 53C (see FIG. 4C) as the damping force calculation section 53 included in the electric suspension device 11 as an example.

Figure 6A:
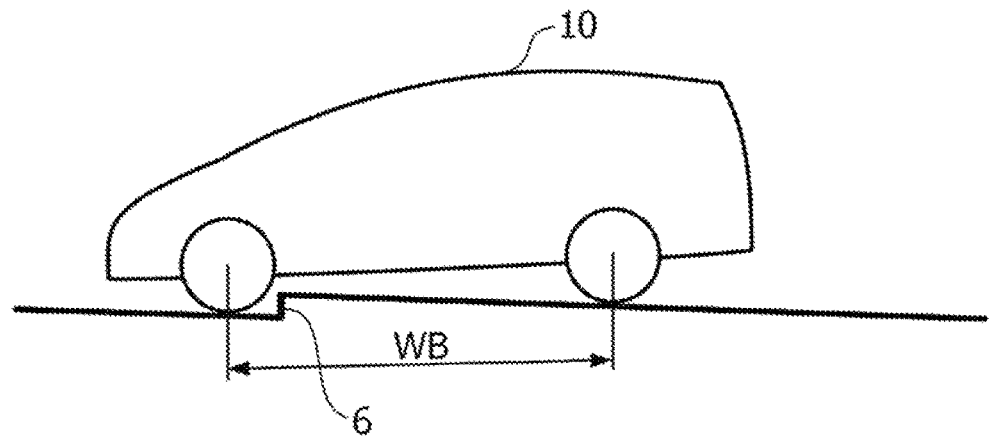
FIG. 6 includes explanatory diagrams (a) to (c) in sequence to illustrate a situation where front and rear wheels of a vehicle sequentially travel over a step.
Figure 6B:
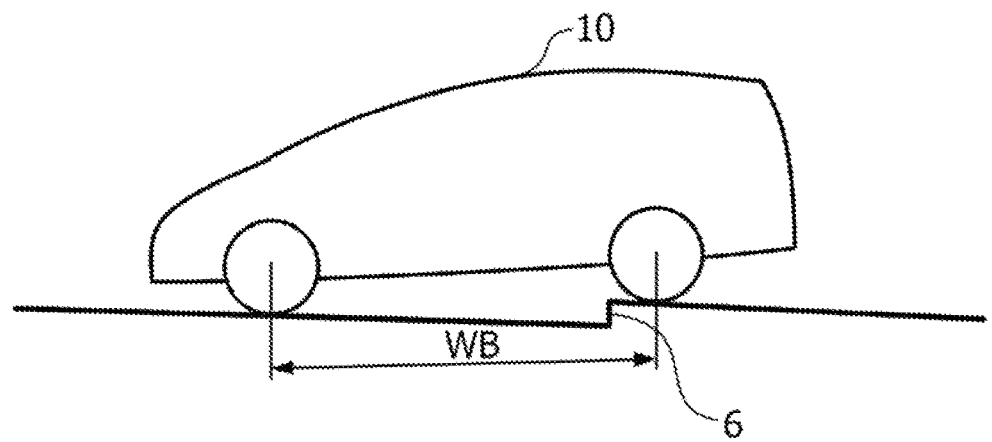
Figure 6C:
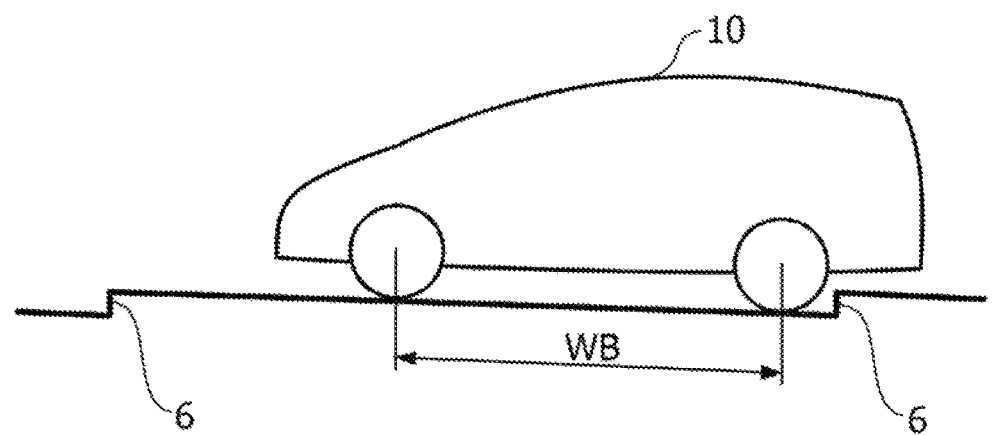

In step S11, the information acquisition section 51 included in each of the first and second damping force calculation sections 53A and 53B, which are included in the ECU 15, acquires various information including: the information on the stoke position of each electric actuator 13; the sprung and unsprung accelerations concerning the front and rear-wheel sides; the roll velocity; the information on the vehicle speed V (vehicle speed information); the information on the wheelbase length (WB information, see (a) to (C) of FIG. 6); the processing delay time information T1; and the information on the default gain G.

In step S12, the bandpass filter 61 of the second damping force calculation section 53B included in the ECU 15 receives the road profile signal based on the front-wheel unsprung acceleration occurring at the unsprung member 1 on the front-wheel side as the vehicle 10 moves forward and performs bandpass filtering for the received road profile signal. To be specific, the bandpass filter 61 performs predetermined bandpass filtering for the received road profile signal and outputs the bandpass-filtered road profile signal in which the predetermined frequency range is intensified.

In step S13, each of the delay time estimation sections 63 of the first and second damping force calculation sections 53A and 53B included in the ECU 15 estimates the delay time Td1, which is the time between when the front-wheel side of the vehicle 10 moving forward receives a road input and when the rear-wheel side receives the same road input subsequently.

In step S14, each of the vehicle speed ratio calculation sections 67 of the first and second damping force calculation sections 53A and 53B included in the ECU 15 calculates the value of the ratio RT corresponding to the vehicle speed V.

In step S15, the wave-shaping and timing-adjustment section 65 of the first damping force calculation section 53A included in the ECU 15 performs wave-shaping to create a signal waveform for implementing vibration damping on the rear-wheel side, from the signal component within the rear-wheel-side vibration damping target frequency range, of the road profile signal based on the acceleration information of the sprung member 3 on the front-wheel side along the expansion-contraction axis. The wave-shaping and timing-adjustment section 65 also adjusts the timing of occurrence of the created signal waveform, based on the delay time Td1 estimated by the delay time estimation section 63.

In step S15, the wave-shaping and timing-adjustment section 65 of the second damping force calculation section 53B included in the ECU 15 performs wave shaping to create a signal waveform for implementing the vibration damping on the rear-wheel side, from the signal component within the rear-wheel-side vibration damping target frequency range of the road profile signal based on the acceleration information of the unsprung member 1 on the front-wheel side along the expansion-contraction axis after being subjected to the bandpass filtering in the bandpass filter 61. The wave-shaping and timing-adjustment section 65 then adjusts the timing of occurrence of the created signal waveform, based on the delay time Td1 estimated by the delay time estimation section 63.

In step S16, each of the multipliers 69 of the first and second damping force calculation sections 53A and 53B, which are included in the ECU 15, receives: the vibration damping signal on the rear-wheel side obtained by the wave shaping and the adjustment of the timing in the wave-shaping and timing-adjustment section 65; the value of the ratio RT calculated by the vehicle speed ratio calculation section 67 (based on the vehicle speed V); and the value of the default gain G. Each multiplier 69 multiplies the vibration damping signal on the rear-wheel side obtained by the wave shaping and the adjustment of the timing by the value of the ratio RT and the value of the default gain G to calculate the first or second target damping force for the vibration damping effect on the rear-wheel side based on the road profile signal on the front-wheel side.

The adder 71 of the third damping force calculation section 53C included in the ECU 15 receives the value of the first target damping force calculated by the first damping force calculation section 53A and the value of the second target damping force calculated by the second damping force calculation section 53B and adds these values to calculate the third target damping force for the vibration damping effect on the rear-wheel side based on the road profile signal on the front-wheel side. The third target damping force calculated by the adder 71 is transmitted to the drive force operating section 55 illustrated in FIG. 3.

The drive force operating section 55 produces a damping force control signal based on the third target damping force on the rear-wheel side calculated by the damping force calculation section 53C and calculates the drive control signal based on the produced damping force control signal.

In step S17, the drive control section 57 included in the ECU 15 supplies a drive control power to the electric motor 31 included in the electromagnetic actuator 13 provided on the rear-wheel side according to the drive control signal transmitted from the drive force operating section 55, thus performing drive control for the electromagnetic actuator 13 provided on the rear-wheel side.

Operation Effect of Electric Suspension Device 11 According to Embodiment of Present Invention Next, the operation effects of the electric suspension device 11 according to the embodiment of the present invention will be described properly with reference to (a) to (c) of FIG. 6 and FIGS. 7A and 7B.

(a) to (c) of FIG. 6 are explanatory diagrams illustrating in sequence, a situation where the front and rear wheels of a vehicle sequentially travel over a step. FIG. 7A is a line diagram illustrating the frequency-unsprung displacement (x1) characteristic concerning the unsprung member 1 on the rear-wheel side in Comparative Example and Example when the rear wheels of the vehicle 10 travel over a step. FIG. 7B is a line diagram illustrating the frequency-sprung displacement (x2) characteristic concerning the sprung member 3 on the rear-wheel side in Comparative Example and Example when the rear wheels of the vehicle 10 travel over a step.

For example, as illustrated in (a) to (c) of FIG. 6, in a situation where the vehicle 10 is moving forward along a road including steps 6 at a certain interval, periodic vibration occurs on the rear-wheel side when the rear wheels travel over a step 6 (see (b) and (c) of FIG. 6) after the front wheels travel over the same step 6 (see (a) of FIG. 6).

In order to properly reduce the vibrations occurring on the rear-wheel side as described above, the electric suspension device 11 based on a first aspect includes: the electromagnetic actuator 13, which is arranged in parallel to the spring member 7, that is provided between the unsprung member 1 including the wheels of the vehicle 10 and the sprung member 3 including the vehicle body, and which produces a drive force for the damping operation and expansion-contraction operation; the information acquisition section 51, which acquires the acceleration informa67tion of at least one of the unsprung member 1 and sprung member 3 along the expansion-contraction axis; the damping force calculation section 53, which calculates a target damping force as a target value for damping operation of the electromagnetic actuator 13; and the drive control section 57, which performs drive control for the electromagnetic actuator 13 using a target drive force based on the target damping force calculated by the damping force calculation section 53.

The electromagnetic actuator 13 is provided at least on the rear-wheel side. The information acquisition section 51 acquires the road profile signal based on the acceleration information concerning at least the front-wheel side. The damping force calculation section 53 calculates the target damping force of the electromagnetic actuator 13 provided on the rear-wheel side, based on the signal component within the rear-wheel-side vibration damping target frequency range, of the road profile signal based on the acceleration information on the front-wheel side acquired by the information acquisition section 51. The drive control section 57 performs drive control for the electromagnetic actuator 13 provided on the rear-wheel side, using the target drive force based on the target damping force calculated by the damping force calculation section 53.

In the electric suspension device 11 based on the first aspect, the rear-wheel-side vibration damping target frequency range is a range of frequencies that produce a feeling of discomfort in occupants among vibrations on the rear-wheel side, which is a frequency range from 4 to 20 Hz, for example. The signal component within the rear-wheel-side vibration damping target frequency range is a signal component within the frequency range from 4 to 20 Hz.

In the electric suspension device 11 based on the first aspect, the target damping force of the electromagnetic actuator 13 provided on the rear-wheel side is calculated based on the signal component within the rear-wheel-side vibration damping target frequency range, of the road profile signal produced at at least any one of the unsprung member 1 and sprung member 3 on the front-wheel side. This reduces the signal component that produces a feeling of discomfort in occupants in the sprung member 3 on the rear-wheel side.

With the electric suspension device 11 based on the first aspect, since the target damping force of the electromagnetic actuator 13 provided on the rear-wheel side is calculated based on the signal component within the rear-wheel-side vibration damping target frequency range, of the road profile signal produced at at least any one of the unsprung member 1 and sprung member 3 on the front-wheel side, the signal component that produces a feeling of discomfort in occupants in the sprung member 3 on the rear-wheel side is reduced. In a situation where the vehicle is traveling along a road with steps at certain intervals, for example, the electric suspension device 11 based on the first aspect properly reduces the vibrations occurring when the rear wheels travel over the steps.

Herein, the vibration damping effect on the rear-wheel side, of the electric suspension device 11 based on the first aspect will be described with reference to FIGS. 7A and 7B.

Figure 7A:
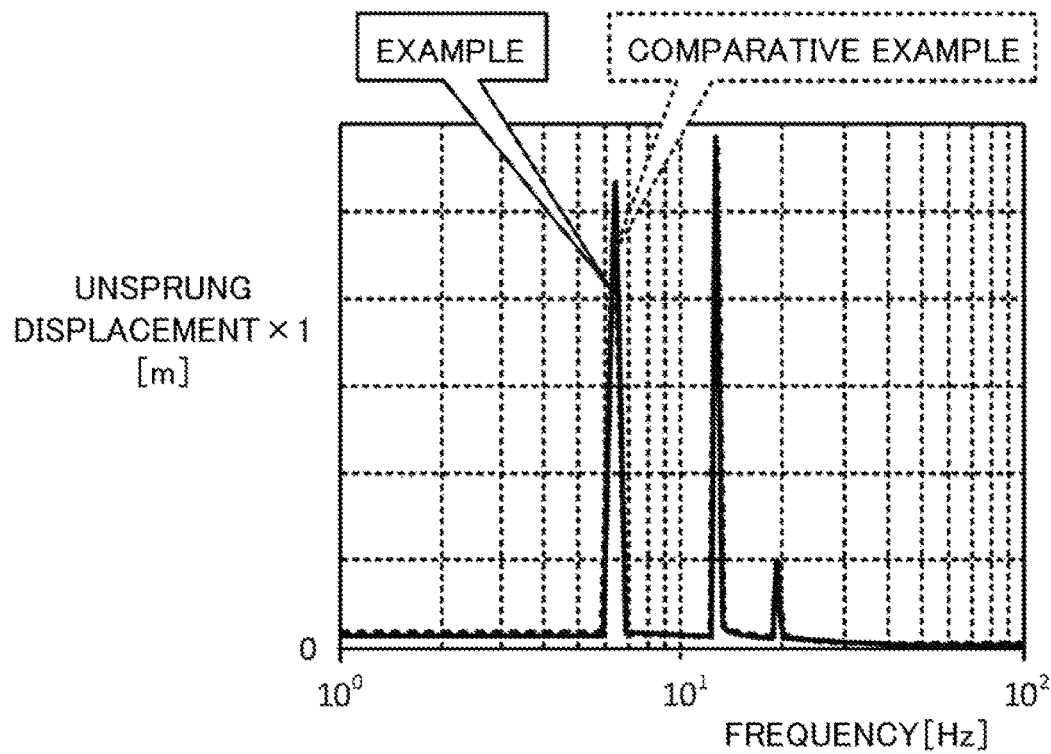
FIG. 7A is a diagram for explaining operation effects of the electric suspension device according to the embodiment of the present invention.

As illustrated in FIG. 7A, the frequency-unsprung displacement (x1) characteristic concerning the unsprung member 1 on the rear-wheel side when the rear wheels of the vehicle 10 travel over a step is substantially equivalent across Comparative Example (with the present invention not applied) and Example (with the present invention applied).

Figure 7B:
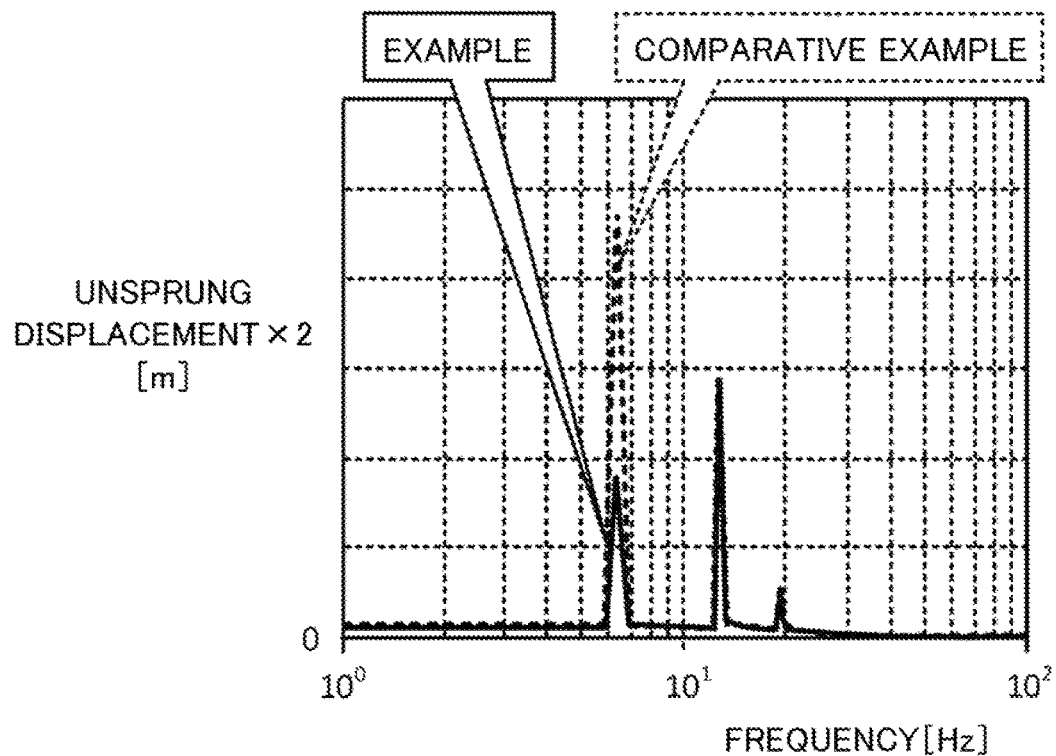
FIG. 7B is a diagram for explaining the operation effects of the electric suspension device according to the embodiment of the present invention.

As for the frequency-unsprung displacement (x2) characteristic concerning the sprung member 3 on the rear-wheel side when the rear wheels of the vehicle 10 travel over a step, at frequencies around about 6.3 Hz, the sprung displacement (x2) in Example (with the present invention applied; see the characteristic line represented by a solid line in FIG. 7B) is about one third of that in Comparative Example (with the present invention not applied; see the characteristic line represented by a dashed line in FIG. 7B) as illustrated in FIG. 7B.

This reveals that the vibration damping effect of Example is pronounced compared to that of Comparative Example in the rear-wheel-side vibration damping target frequency range (the range of frequencies that produce a feeling of discomfort in occupants; 4 to 20 Hz, for example) according to the present invention.

The electric suspension device 11 based on a second aspect is the electric suspension device 11 based on the first aspect, further including: the bandpass filter 61 (extraction section), which extracts the signal component within the rear-wheel-side vibration damping target frequency range from the road profile signal based on the acceleration information on the front-wheel side acquired by the information acquisition section 51; the delay time estimation section 63, which estimates the delay time Td1 occurring when the front wheels and rear wheels receive the same road input (the step 6 in FIG. 6) as the vehicle 10 travels; the wave-shaping and timing-adjustment section 65, which performs wave shaping to create a signal waveform for implementing the vibration damping on the rear-wheel side, from the signal component within the rear-wheel-side vibration damping target frequency range of the road profile signal on the front-wheel side after being subjected to the bandpass filtering in the bandpass filter 61 (extraction section), and adjusts the timing of occurrence of the created signal waveform, based on the delay time Td1 estimated by the delay time estimation section 63. The damping force calculation section 53 calculates the target damping force of the electromagnetic actuator 13 provided on the rear-wheel, based on the signal waveform with the timing of occurrence adjusted by the wave-shaping and timing-adjustment section 65. The drive control section 57 uses the target drive force based on the target damping force calculated by the damping force calculation section 53 for drive control of the electromagnetic actuator 13 provided on the rear-wheel side.

In the electric suspension device 11 based on the second aspect, the wave-shaping and timing-adjustment section 65 performs the wave shaping to create a signal waveform for implementing the vibration damping on the rear-wheel side, from the signal component within the rear-wheel-side vibration damping target frequency range of the road profile signal on the front-wheel side after being subjected to the bandpass filtering in the bandpass filter 61 and adjusts the timing of occurrence of the created signal waveform, based on the delay time Td1 estimated by the delay time estimation section 63.

Herein, to perform wave shaping to create a signal waveform for implementing the vibration damping on the rear-wheel side, from the signal component within the rear-wheel-side vibration damping target frequency range is to perform wave shaping to create an antiphase signal waveform to the same signal component in order to reduce the gain of the signal component.

The damping force calculation section 53 calculates the target damping force of the electromagnetic actuator 13 provided on the rear-wheel side, based on the vibration damping signal obtained by the wave shaping and the adjustment of the timing of occurrence in the wave-shaping and timing-adjustment section 65. The drive control section 57 uses the target drive force based on the target damping force calculated by the damping force calculation section 53 to perform drive control for the electromagnetic actuator 13 provided on the rear-wheel side. The electromagnetic actuator 13 on the rear-wheel side thereby produces a counter load to a load input due to the signal component within the rear-wheel-side vibration damping target frequency range.

With the electric suspension device 11 based on the second aspect, the target damping force of the electromagnetic actuator 13 on the rear-wheel side is calculated based on the vibration damping signal obtained by the wave shaping and the adjustment of the timing of occurrence by the wave-shaping and timing-adjustment section 65, and the target drive force based on the calculated target damping force is used for the drive control of the electromagnetic actuator 13 on the rear-wheel side. In the situation where the vehicle is traveling along a road with steps at certain intervals, for example, the electric suspension device 11 based on the second aspect therefore provides a greater effect in properly reducing the vibrations occurring when rear wheels travel over a step than the electric suspension device 11 based on the first aspect.

The electric suspension device 11 based on a third aspect is the electric suspension device 11 based on the second aspect, in which the information acquisition section 51 further acquires the vehicle speed information V, wheelbase information WB, and processing delay time information T1 of the vehicle 10, and the delay time estimation section 63 estimates the delay time Td1 based on the vehicle speed information V, wheelbase information WB, and processing delay time information T1 acquired by the information acquisition section 51.

With the electric suspension device 11 based on the third aspect, since the delay time estimation section 63 estimates the delay time Td1 based on the vehicle speed information V, wheelbase information WB, and processing delay time information T1 acquired by the information acquisition section 51, the timing of occurrence concerning the calculated signal waveform is adjusted by the wave-shaping and timing-adjustment section 65, based on the delay time Td1 estimated by the delay time estimation section 63 with a higher degree of accuracy than that in the electric suspension device 11 based on the second aspect.

Other Embodiment

The plural embodiments described above are examples embodying the present invention. These embodiments should not limit the interpretation of the technical scope of the present invention. The present invention can be implemented in various modes without departing from the spirit thereof or the main features thereof.

What is claimed is:

1. An electric suspension device, comprising:
an electromagnetic actuator which is provided at least on a rear wheel side and is arranged in parallel to a spring member provided between an unsprung member including wheels of a vehicle and a sprung member including a vehicle body, the electromagnetic actuator producing a drive force for damping operation and expansion-contraction operation;
an information acquisition section which acquires a first acceleration information of the unsprung member on a front wheel side along an expansion-contraction axis, and a second acceleration information of the sprung member on the front wheel side along the expansion-contraction axis, wherein the information acquisition section acquires a first road profile signal based on the first acceleration information and a second road profile signal based on the second acceleration information;
a damping force calculation section which calculates a target damping force as a target value for the damping operation of the electromagnetic actuator;
a drive controller which performs drive control of the electromagnetic actuator using a target drive force calculated based on the target damping force calculated by the damping force calculation section;
an extraction section which extracts a signal component from the second road profile signal, wherein the signal component is in a rear-wheel-side vibration damping target frequency range;
a wave-shaping section which
performs wave shaping on the first road profile signal to create a first signal waveform for implementing vibration damping on the rear-wheel side, and
performs wave shaping on the signal component extracted from the second road profile signal by the extraction section to create a second signal waveform for implementing vibration damping on the rear-wheel side; and
an adder,
wherein
the damping force calculation section calculates a first target damping force based on the first signal waveform and a second target damping force based on the second signal waveform,
the adder adds the first target damping force and the second target damping force to calculate a third target damping force, and
the drive controller performs drive control for the electromagnetic actuator provided on the rear-wheel side, using the target drive force calculated based on the third target damping force obtained by the adder.

2. The electric suspension device according to claim claim 1, further comprising:
a delay time estimation section which estimates a delay time occurring when the front and rear wheels receive a same road input as the vehicle travels; and
a timing-adjustment section which performs adjustment of a timing of occurrence of the first and second signal waveforms based on the delay time estimated by the delay time estimation section, wherein
the information acquisition section acquires vehicle speed information, wheelbase information, and processing delay time information of the vehicle, and
the delay time estimation section estimates the delay time based on the vehicle speed information, wheelbase information, and processing delay time information which are acquired by the information acquisition section.

* * * * *